United States Patent
Brown et al.

(10) Patent No.: US 10,614,023 B2
(45) Date of Patent: *Apr. 7, 2020

(54) PROCESSOR CORE TO COPROCESSOR INTERFACE WITH FIFO SEMANTICS

(71) Applicant: Oracle International Corporation, Redwood Shores, CA (US)

(72) Inventors: David A. Brown, Austin, TX (US); Daniel Fowler, Austin, CA (US); Rishabh Jain, Austin, TX (US); Erik Schlanger, Austin, TX (US); Michael Duller, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,793

(22) Filed: Jun. 28, 2019

(65) Prior Publication Data

US 2019/0324939 A1 Oct. 24, 2019

Related U.S. Application Data

(63) Continuation of application No. 15/256,936, filed on Sep. 6, 2016, now Pat. No. 10,380,058.

(51) Int. Cl.
*G06F 13/42* (2006.01)
*G06F 1/3234* (2019.01)
*G06F 1/32* (2019.01)

(52) U.S. Cl.
CPC ........ *G06F 13/4221* (2013.01); *G06F 1/3243* (2013.01); *Y02D 10/152* (2018.01)

(58) Field of Classification Search
CPC .......................... G06F 13/4221; G06F 1/3296
(Continued)

(56) References Cited

U.S. PATENT DOCUMENTS

| 4,626,829 A | 12/1986 | Hauck |
| 5,109,226 A | 4/1992 | MacLean |

(Continued)

FOREIGN PATENT DOCUMENTS

| EP | 1 111 500 A1 | 3/1996 |
| EP | 2040180 A1 | 3/2009 |

(Continued)

OTHER PUBLICATIONS

Park et al., "Polymorphic Pipeline Array: A Flexible Multicore Accelerator with Virtualized Execution for Mobile Multimedia Applications", Dated Dec. 12, 2009 11 pages.

(Continued)

*Primary Examiner* — Christopher B Shin
(74) *Attorney, Agent, or Firm* — Hickman Palermo Becker Bingham LLP

(57) ABSTRACT

Techniques are provided for exchanging dedicated hardware signals to manage a first-in first-out (FIFO). In an embodiment, a first processor initiates content transfer into the FIFO. The first processor activates a first hardware signal that is reserved for indicating that content resides within the FIFO. A second processor activates a second hardware signal that is reserved for indicating that content is accepted. The second hardware signal causes the first hardware signal to be deactivated. This exchange of hardware signals demarcates a FIFO transaction, which is mediated by interface circuitry of the FIFO.

20 Claims, 7 Drawing Sheets

COMPUTER 100

(58) Field of Classification Search
USPC .......................................................... 710/105
See application file for complete search history.

(56) References Cited

U.S. PATENT DOCUMENTS

| | | | |
|---|---|---|---|
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |
| 5,581,705 A | 12/1996 | Passint et al. |
| 5,592,622 A | 1/1997 | Isfeld |
| 5,617,567 A | 4/1997 | Doktor |
| 5,655,080 A | 8/1997 | Dias et al. |
| 5,675,382 A | 10/1997 | Bauchspies |
| 5,696,959 A | 12/1997 | Guttag |
| 5,706,495 A | 1/1998 | Chadha Atul et al. |
| 5,826,529 A | 10/1998 | Doktor |
| 5,887,183 A | 3/1999 | Agarwal |
| 5,884,229 A | 5/1999 | Ramesh et al. |
| 5,933,650 A | 8/1999 | Van Hook |
| 5,987,407 A | 11/1999 | Wu |
| 5,996,708 A | 12/1999 | Gerold |
| 6,006,179 A | 12/1999 | Wu |
| 6,047,081 A | 4/2000 | Groezinger et al. |
| 6,065,070 A | 5/2000 | Johnson |
| 6,118,724 A | 9/2000 | Higginbottom |
| 6,161,173 A | 12/2000 | Krishna |
| 6,178,405 B1 | 1/2001 | Ouyang |
| 6,219,457 B1 | 4/2001 | Potu |
| 6,317,824 B1 | 11/2001 | Thakkar et al. |
| 6,331,826 B1 | 12/2001 | Wagner |
| 6,336,180 B1 | 1/2002 | Long |
| 6,381,601 B1 | 4/2002 | Fujiwara et al. |
| 6,416,410 B1 | 7/2002 | Abou-Samra |
| 6,496,915 B1 | 12/2002 | Halleck |
| 6,604,155 B1 | 8/2003 | Chong et al. |
| 6,671,797 B1 | 12/2003 | Golston |
| 6,745,174 B2 | 6/2004 | Levy et al. |
| 6,779,105 B1 | 8/2004 | Bouyoux |
| 6,829,697 B1 | 12/2004 | Davis et al. |
| 6,842,848 B2 | 1/2005 | Hokenek et al. |
| 6,996,569 B1 | 2/2006 | Bedell et al. |
| 7,047,252 B2 | 5/2006 | Buch et al. |
| 7,490,221 B2 * | 2/2009 | Evans .................. G06F 9/3842 708/508 |
| 7,617,346 B2 | 11/2009 | Wang et al. |
| 7,725,595 B1 | 5/2010 | Geissler et al. |
| 7,769,726 B2 | 8/2010 | Faerber et al. |
| 7,861,060 B1 | 12/2010 | Nickolls et al. |
| 7,991,794 B2 | 8/2011 | Bedi et al. |
| 8,049,760 B2 | 11/2011 | Jiao et al. |
| 8,126,855 B2 | 2/2012 | Faerber et al. |
| 8,260,803 B2 | 9/2012 | Hsu et al. |
| 8,285,709 B2 | 10/2012 | Candea et al. |
| 8,326,810 B2 | 12/2012 | Faerber et al. |
| 8,375,145 B2 | 2/2013 | Kagan et al. |
| 8,521,788 B2 | 8/2013 | Ellison et al. |
| 8,533,216 B2 | 9/2013 | Buger et al. |
| 8,543,534 B2 | 9/2013 | Alves et al. |
| 8,572,131 B2 | 10/2013 | Ellison et al. |
| 8,589,613 B2 | 11/2013 | Griggs |
| 8,667,252 B2 | 3/2014 | Colavin et al. |
| 8,725,707 B2 | 5/2014 | Chen et al. |
| 8,826,522 B2 | 9/2014 | Roblot |
| 8,938,644 B2 | 1/2015 | Clark et al. |
| 8,996,463 B2 | 3/2015 | Merriman et al. |
| 9,405,476 B2 | 8/2016 | Joshi et al. |
| 9,432,298 B1 | 8/2016 | Smith |
| 9,658,675 B1 | 5/2017 | Witek |
| 9,658,676 B1 * | 5/2017 | Witek .................. G06F 1/3237 |
| 9,977,664 B2 * | 5/2018 | Toyama .................. G06F 8/451 |
| 2001/0037345 A1 | 11/2001 | Kiernan |
| 2002/0032678 A1 | 3/2002 | Cornwell et al. |
| 2002/0033762 A1 | 3/2002 | Belu |
| 2002/0091826 A1 | 7/2002 | Comeau |
| 2002/0091905 A1 | 7/2002 | Krishna |
| 2002/0095562 A1 | 7/2002 | Nakanishi |
| 2002/0154154 A1 | 10/2002 | Cornelius |
| 2002/0165896 A1 | 11/2002 | Kim |
| 2002/0184392 A1 | 12/2002 | Parthasarathy et al. |
| 2002/0188830 A1 | 12/2002 | Boles et al. |
| 2003/0135495 A1 | 7/2003 | Vagnozzi |
| 2003/0167460 A1 | 9/2003 | Desai |
| 2003/0182464 A1 | 9/2003 | Hamilton |
| 2003/0187858 A1 | 10/2003 | Kirk et al. |
| 2004/0030863 A1 | 2/2004 | Paver |
| 2004/0068642 A1 | 4/2004 | Tanaka |
| 2004/0160446 A1 | 8/2004 | Gosalia |
| 2004/0221192 A1 | 11/2004 | Motta |
| 2005/0091256 A1 | 4/2005 | Rathakrishnan et al. |
| 2005/0177706 A1 | 8/2005 | Lee |
| 2006/0116989 A1 | 6/2006 | Bellamkonda et al. |
| 2006/0179255 A1 | 8/2006 | Yamazaki |
| 2007/0061600 A1 | 3/2007 | Kuroda |
| 2007/0074214 A1 | 3/2007 | Ueno |
| 2007/0203925 A1 | 8/2007 | Sandler et al. |
| 2008/0046686 A1 | 2/2008 | Cameron |
| 2008/0134213 A1 | 6/2008 | Alverson |
| 2008/0294863 A1 | 11/2008 | Faerber et al. |
| 2009/0028192 A1 | 1/2009 | Rieger |
| 2009/0037700 A1 | 2/2009 | Graham |
| 2009/0055350 A1 | 2/2009 | Branish et al. |
| 2009/0094193 A1 | 4/2009 | King et al. |
| 2009/0235047 A1 * | 9/2009 | Hachmann ............ G06F 9/3877 712/29 |
| 2009/0287628 A1 | 11/2009 | Indeck |
| 2009/0287637 A1 | 11/2009 | Day et al. |
| 2009/0313210 A1 | 12/2009 | Bestgen et al. |
| 2010/0020880 A1 | 1/2010 | Susnow |
| 2010/0030728 A1 | 2/2010 | Chakkappen et al. |
| 2010/0030796 A1 | 2/2010 | Netz et al. |
| 2010/0082705 A1 | 4/2010 | Bhashyam et al. |
| 2010/0088309 A1 | 4/2010 | Petcelescu et al. |
| 2010/0106944 A1 | 4/2010 | Symes |
| 2010/0115295 A1 | 5/2010 | Diab |
| 2010/0115347 A1 | 5/2010 | Noyes |
| 2010/0161646 A1 | 6/2010 | Ceballos et al. |
| 2010/0191918 A1 | 7/2010 | Lee et al. |
| 2010/0257391 A1 | 10/2010 | Dring |
| 2010/0278446 A1 | 11/2010 | Ganesh et al. |
| 2010/0299316 A1 | 11/2010 | Faerber et al. |
| 2011/0029557 A1 | 2/2011 | Raghavan et al. |
| 2011/0106804 A1 | 5/2011 | Keeler et al. |
| 2011/0228325 A1 | 9/2011 | Shiraishi |
| 2012/0005509 A1 | 1/2012 | Araki |
| 2012/0014265 A1 | 1/2012 | Schlansker |
| 2012/0054225 A1 | 3/2012 | Marwah et al. |
| 2012/0071152 A1 | 3/2012 | Roundtree |
| 2012/0159448 A1 | 6/2012 | Arcese |
| 2012/0166447 A1 | 6/2012 | Nice |
| 2012/0197868 A1 | 8/2012 | Fauser |
| 2012/0209873 A1 | 8/2012 | He |
| 2012/0234908 A1 | 9/2012 | Wang |
| 2013/0151458 A1 | 6/2013 | Indeck |
| 2013/0151567 A1 | 6/2013 | Ellison et al. |
| 2013/0151568 A1 | 6/2013 | Ellison et al. |
| 2013/0275473 A1 | 10/2013 | Ellison et al. |
| 2013/0303663 A1 | 11/2013 | Agnely et al. |
| 2014/0013076 A1 | 1/2014 | Ganesh |
| 2014/0013077 A1 | 1/2014 | Ganesh et al. |
| 2014/0013078 A1 | 1/2014 | Ganesh et al. |
| 2014/0052713 A1 | 2/2014 | Schauer et al. |
| 2014/0052726 A1 | 2/2014 | Amberg et al. |
| 2014/0068183 A1 | 3/2014 | Joshi |
| 2014/0074818 A1 | 3/2014 | Barber |
| 2014/0095748 A1 | 4/2014 | Aingaran et al. |
| 2014/0096145 A1 | 4/2014 | Aingaran et al. |
| 2014/0208138 A1 | 7/2014 | Homchaudhuri |
| 2014/0208331 A1 | 7/2014 | Li |
| 2014/0281354 A1 | 9/2014 | Tkacik |
| 2014/0304490 A1 * | 10/2014 | Toyama .................. G06F 8/451 712/30 |
| 2015/0046411 A1 | 2/2015 | Kazmaier |

(56) References Cited

U.S. PATENT DOCUMENTS

| | | |
|---|---|---|
| 2015/0074384 A1 | 3/2015 | Yajima |
| 2015/0088926 A1 | 3/2015 | Chavan et al. |
| 2015/0181273 A1 | 6/2015 | Shaool |
| 2015/0261535 A1 | 9/2015 | Snyder, II |
| 2016/0007037 A1 | 1/2016 | Zhao et al. |
| 2016/0019064 A1 | 1/2016 | Brooks et al. |
| 2016/0285623 A1 | 9/2016 | Yoon |
| 2016/0350347 A1 | 12/2016 | Das et al. |
| 2017/0024435 A1 | 1/2017 | Kociubes et al. |
| 2017/0039238 A1 | 2/2017 | Elias |
| 2017/0060587 A1 | 3/2017 | Chavan |
| 2017/0085378 A1 | 3/2017 | Shields |
| 2017/0185527 A1 | 6/2017 | Ueda |
| 2017/0270052 A1 | 9/2017 | Brown et al. |
| 2017/0270053 A1 | 9/2017 | Brown |
| 2017/0322725 A1 | 11/2017 | Klingenberg |
| 2018/0004242 A1 | 1/2018 | Suresh |
| 2018/0004581 A1 | 1/2018 | Brown |
| 2018/0067889 A1 | 3/2018 | Brown |
| 2018/0101530 A1 | 4/2018 | Brown |
| 2018/0107627 A1 | 4/2018 | LeBeane et al. |

FOREIGN PATENT DOCUMENTS

| | | |
|---|---|---|
| EP | 2423843 A1 | 2/2012 |
| GB | 2 306 868 A | 5/1997 |
| GB | 2338095 A | 12/1999 |
| JP | 2000261674 A | 9/2000 |
| WO | WO 00/08552 A1 | 2/2000 |
| WO | WO 2010/039895 | 4/2010 |
| WO | WO 2013/095653 A1 | 6/2013 |
| WO | WO 2013/095662 A1 | 6/2013 |

OTHER PUBLICATIONS

"MonetDB", Wikipedia, available: http://en.wikipedia.org/wiki/MonetDB, dated May 16, 2012, 3 pages.

Anonymous:, "Hash Table—Wikipedia, the free encyclopedia", dated Jun. 20, 2012, retrieved from the internet: http://wayback.archive.org/wiki/harshtable, 18 pages.

Binkert et al., "A Simple Integrated Network Interface for High-Bandwidth Servers", dated Jan. 2006, 22 pages.

Brewer et al., "Remote Queues: Exposing Message Queues for Optimization and Atomicity", dated Jul. 17, 1995, ACM, 12 pages.

CCCP: Accelerator Virtualization, http://cccp.eecs.umich.edu/research/virtual.php, printed on Jul. 4, 2012, 3 pages.

Chandramohan A. Thekkath et al. "Separating Data and Control Transfer in Distributed Operating Systems", Architectural Support for Programming Languages and Operating Systems, dated Nov. 1, 1994, 10 pgs.

Coprocessor Wizard, Platform Studio, http://www.xilinx.com/itp/xilinx10/help/platform_studio/ps_c_cpw_coprocessor_wizard.htm, 2008, 2 pages.

Dynamic Scheduling Techniques, http://www.cs.iastate.edu/~prabhu/Tutorial/PIPELINE/dynamSchedTech.html, printed on Jul. 4, 2012, 2 pages.

IBM Technical Disclosure Bulletin, "Data Packing and Upacking Scheme for High Performance Image Processing", vol. No. 7, dated Jul. 1993, 6 pages.

"Column Store Features" monedb, available: http://moneybd.org/Home/Features, dated 2008-2013, 3 pages.

O'Brien, Frank, "The Appollo Guidance Computer—Architecture and Operation", dated 2010, Springer, pp. 27-28, 54, 76 and 1414.

Zukowski, M. "Vectorwise: Beyond Column Stores" ACTIAN 2012, 17 pages.

Schlegel et al., "Fast Integer Compression Using SIMD Instructions", dated 2010, ACM, 7 pages.

Schmit et al., "PipeRench: A Virtualized Programmable Datapath in 0.18 Micron Technology", dated 2002, 4 pages.

Silva et al., "Using a Tighly-Coupled Pipeline in Dynamically Reconfigureable Platform FPGAs", dated May 2003, 4 pages.

Thekkath et al., "Separating Data and Control Transfer in Distributed Operating Systems", ASPLOS, San Jose, ACM, dated 1994, 10 pages.

W. Cockshott et al., "High-Performance Operations Using a Compressed Database Architecture", The Computer Journal, vol. 41, 1998, 14 pages.

Weinhardt, Markus, "Compilation and Pipeline Synthesis for Reconfigurable Architectures", 1997, 8 pages.

Wikipedia, "In Memory Database", Dated Jan. 30, 2013, 4 pages.

Wikipedia, "SIMD", Single Instruction Multiple Instruction, dated Jan. 1, 2013, 7 pages.

Zhou et al., "Efficient SIMD Optimization for Media Processors", Journal of Zhejiang University Science A, dated Apr. 2008, 7 pages.

IBM, "Data Packing and Unpacking Scheme for High Performance Image Processing", vol. 36., No. 7, dated Jul. 1993, 6 pages.

Brown, U.S. Appl. No. 15/290,357, filed Oct. 11, 2016, Interview Summary, dated Mar. 5, 2019.

Brown, U.S. Appl. No. 15/197,436, filed Jun. 29, 2016, Office Action, dated Dec. 13, 2018.

Brown, U.S. Appl. No. 15/256,936, filed Sep. 6, 2016, Interview Summary, dated Dec. 19, 2018.

Brown, U.S. Appl. No. 15/256,936, filed Sep. 6, 2016, Notice of Allowance, dated Mar. 29, 2019.

Brown, U.S. Appl. No. 15/256,936, filed Sep. 6, 2016, Office Action, dated Sep. 20, 2018.

Brown, U.S. Appl. No. 15/256,936, filed Sep. 6, 2016, Suplemental Notice of Allowability, dated May 24, 2019.

Brooks, U.S. Appl. No. 14/867,929, filed Sep. 28, 2015, Advisory Action, dated Aug. 28, 2018.

Brown, U.S. Appl. No. 15/290,357, filed Oct. 11, 2016, Final Office Action, dated Feb. 15, 2019.

Brown, U.S. Appl. No. 15/197,436, filed Jun. 29, 2016, Interview Summary, dated Feb. 25, 2019.

Brown, U.S. Appl. No. 15/290,357, filed Oct. 11, 2016, Interview Summary, dated Aug. 28, 2019.

Brown, U.S. Appl. No. 15/290,357, filed Oct. 11, 2016, Interview Summary, dated Dec. 4, 2018.

Brown, U.S. Appl. No. 15/290,357, filed Oct. 11, 2016, Office Action, dated Jul. 1, 2019.

Brown, U.S. Appl. No. 15/290,357, filed Oct. 11, 2016, Office Action, dated Aug. 27, 2018.

Brown, U.S. Appl. No. 15/362,688, filed Nov. 28, 2016, Notice of Allowance, dated Apr. 25, 2019.

Brown, U.S. Appl. No. 15/290,357, filed Oct. 11, 2016, Advisory Action, dated Mar. 15, 2019.

Brown, U.S. Appl. No. 15/073,905, filed Mar. 18, 2016, Notice of Allowance, dated Apr. 24, 2018.

Brooks, U.S. Appl. No. 14/867,929, filed Sep. 28, 2015, Final Office Action, dated May 31, 2018.

Brooks, U.S. Appl. No. 14/867,929, filed Sep. 28, 2015, Interview Summary, dated Apr. 25, 2018.

Brooks, U.S. Appl. No. 14/867,929, filed Sep. 28, 2015, Interview Summary, dated Jun. 27, 2019.

Brooks, U.S. Appl. No. 14/867,929, filed Sep. 28, 2015, Notice of Allowance, dated Aug. 28, 2019.

Brooks, U.S. Appl. No. 14/867,929, filed Sep. 28, 2015, Office Action, dated Mar. 18, 2019.

Brooks, U.S. Appl. No. 14/867,929, filed Sep. 28, 2015, Office Action, dated Jul. 13, 2017.

Brown, U.S. Appl. No. 15/197,436, filed Jun. 29, 2016, Office Action, dated Nov. 29, 2017.

Brown, U.S. Appl. No. 15/197,436, filed Jun. 29, 2016, Interview Summary, dated May 3, 2019.

Brown, U.S. Appl. No. 15/073,905, filed Mar. 18, 2016, Office Action, dated Sep. 25, 2017.

Brown, U.S. Appl. No. 15/074,248, filed Mar. 18, 2016, Office Action, dated Sep. 25, 2017.

Brown, U.S. Appl. No. 15/197,436, filed Jun. 29, 2016, Advisory Action, dated Jun. 12, 2019.

Brown, U.S. Appl. No. 15/197,436, filed Jun. 29, 2016, Advisory Action, dated Sep. 7, 2018.

(56) References Cited

OTHER PUBLICATIONS

Brown, U.S. Appl. No. 15/197,436, filed Jun. 29, 2016, Final Office Action, dated Jun. 11, 2018.
Chavan, U.S. Appl. No. 14/338,219, filed 047/22/2014, Interview Summary, dated Sep. 11, 2017.
U.S. Appl. No. 14/023,249, filed Sep. 10, 2013, Office Action, dated Jan. 20, 2016.
Brown, U.S. Appl. No. 15/197,4736, filed Jun. 29, 2016, Office Action, dated Dec. 13, 2018.
U.S. Appl. No. 13/590,110, filed Aug. 20, 2012, Office Action, dated Jul. 1, 2014.
U.S. Appl. No. 13/590,110, filed Aug. 20, 2012, Office Action, dated Oct. 2, 2015.
U.S. Appl. No. 13/590,110, filed Aug. 20, 2012, Office Action, dated Dec. 18, 2013.
U.S. Appl. No. 13/590,110, filed Aug. 20, 2012, Notice of Allowance, dated Aug. 1, 2016.
U.S. Appl. No. 13/590,110, filed Aug. 20, 2012, Office Action, dated Apr. 14, 2016.
U.S. Appl. No. 13/590,110, filed Aug. 20, 2012, Final Office Action, dated Mar. 27, 2015.
U.S. Appl. No. 14/023,064, filed Sep. 10, 2013, Office Action, dated Mar. 28, 2016.
U.S. Appl. No. 13/590,057, filed Aug. 20, 2012, Office Action, dated Jul. 1, 2014.
U.S. Appl. No. 14/023,249, filed Sep. 10, 2013, Office Action, dated Aug. 25, 2016.
U.S. Appl. No. 15/362,693, filed Nov. 28, 2016, Notice of Allowance, dated Aug. 7, 2018.
U.S. Appl. No. 13/590,057, filed Aug. 20, 2012, Office Action, dated Jan. 7, 2014.
U.S. Appl. No. 14/023,064, filed Sep. 10, 2013, Notice of Publication of Application, dated Jan. 9, 2014.
U.S. Appl. No. 14/023,249, filed Sep. 10, 2013, Notice of Publication of Application, dated Jan. 9, 2014.
U.S. Appl. No. 14/023,064, filed Sep. 10, 2013, Final Office Action, dated Oct. 6, 2016.
Kociubes U.S. Appl. No. 14/806,576, filed Jul. 22, 2015, Interview Summary, dated Feb. 14, 2018.
U.S. Appl. No. 13/590,057, filed Aug. 20, 2012, Advisory Action, dated Feb. 11, 2016.
Chavan, U.S. Appl. No. 14/338,219, filed Jul. 22, 2014, Notice of Allowance, dated Sep. 25, 2017.
Chavan, U.S. Appl. No. 14/338,219, filed Jul. 22, 2014, Restriction Requirement, dated Jan. 13, 2017.
Chavan, U.S. Appl. No. 14/3385,219, filed Jul. 22, 2014, Office Action, dated Jun. 2, 2017.
Chavan, U.S. Appl. No. 15/211,418, filed Jul. 15, 2016, Notice of Allowance, dated Oct. 31, 2018.
Chavan, U.S. Appl. No. 15/211,418, filed Jul. 15, 2016, Office Action, dated May 4, 2018.
Ganesh, U.S. Appl. No. 14/023,249, filed Sep. 10, 2013, Notice of Allowance, dated Feb. 27, 2017.
Brownb, U.S. Appl. No. 15/197,436, filed Jun. 29, 2016, Final Office Action, dated Mar. 28, 2019.
Kociubes, U.S. Appl. No. 14/806,576, filed Jul. 22, 2015, Notice of Allowance, dated Apr. 11, 2018.
U.S. Appl. No. 13/590,057, filed Aug. 20, 2012, Advisory Aciton, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,057, filed Aug. 20, 2012, Office Action, dated Apr. 22, 2015.
Ganesh, U.S. Appl. No. 14/023,064, filed Sep. 10, 2013, Notice of Allowance, dated Jun. 16, 2017.
Brown, U.S. Appl. No. 15/290,357, filed Oct. 11, 2016, Final Office Action, dated Nov. 29, 2019.

* cited by examiner

PROCESSOR CORE TO COPROCESSOR INTERFACE WITH FIFO SEMANTICS

PRIORITY CLAIM; RELATED APPLICATION

This application claims the benefit as a continuation of U.S. patent application Ser. No. 15/256,936, filed Sep. 6, 2016, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

This disclosure relates to coprocessor workflow. Techniques are presented for exchanging dedicated hardware signals to manage a first-in first-out (FIFO) that is used by more than one computational processing component.

BACKGROUND

Complex, performance-oriented processor subsystems consist of a processor core and some number of coprocessors. The processor off-loads tasks to the coprocessors, which typically perform specialized functions that they are optimized for. The type and number of coprocessors depends on many system aspects such as performance requirements, the type of processing tasks that need to be off-loaded from the core, and power and size considerations.

One technique for connecting a core to its associated coprocessors involves direct connection between a core and a coprocessor. The core connects directly to the coprocessor through a coprocessor interface. The interface typically consists of signals going from the core to the coprocessor that indicate the function that the coprocessor is to perform along with the arguments that the function is to be performed on. Signals from the coprocessor to the core are used to convey the results of the function. This type of connection may be used for a coprocessor that has a relatively shallow processing pipeline. Typically, the thread that the core is executing and that transfers work to the coprocessor is stalled until the coprocessor returns a result to the core. The coprocessor does not have many execution threads, and may be single-threaded. The coprocessor executes only one unit of work at a time. An example of this type of coprocessor may be a floating point unit. Such an interface has no facility for handling a backlog and for deferring coprocessor work. This technique may be suboptimal due to dark (idle) silicon and reduced system throughput.

Another technique involves indirect connectivity between core and coprocessor. Function invocations or other work units for the coprocessor are placed in a common memory that both the core and coprocessor have access to. The core builds a work queue for the coprocessor in the common memory and starts the coprocessor executing the work queue via a configuration register access to the coprocessor. The coprocessor executes the functions on the work queue and returns results to a dedicated memory in the coprocessor that the core has access to, a common shared memory, or directly to the core. An example of this type of coprocessor would be a direct memory access (DMA) engine. However this technique involves the core initializing configuration registers, the coprocessor updating the configuration registers to indicate completion status, and the core monitoring the configuration registers, perhaps by polling. The technique may be suboptimal due to complexity of coordination logic in the core and coprocessor and increased power consumption.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | General Overview | |
| 2.0 | Example Computer | |
| | 2.1 | Processor |
| | 2.2 | FIFO |
| | 2.3 | Circuitry and Signal |
| | 2.4 | Storage |
| | 2.5 | Transaction |
| 3.0 | Example FIFO Signaling Process | |
| 4.0 | Example Topology | |
| 5.0 | Example Scenario | |
| | 5.1 | Condition |
| | 5.2 | Peek |
| | 5.3 | Blocking |
| | 5.4 | Transaction Acceptance |
| | 5.5 | Pop |
| | 5.6 | Empty |
| | 5.7 | Batch |
| 6.0 | Another Example Scenario | |
| | 6.1 | Push |
| | 6.2 | Contention |
| | 6.3 | Saturation |
| | 6.4 | Hardware Pop |
| | 6.5 | Workflow |
| 7.0 | Memory Management | |
| | 7.1 | Pre-Allocation |
| | 7.2 | Reconfiguration |
| | 7.3 | Linked List |

| | |
|---|---|
| 7.4 | Pointer |
| 7.5 | Metadata |
| 7.6 | Interface |
| 7.7 | Queue |
| 7.8 | Dual Lists |
| 8.0 | Hardware Overview |

1.0 General Overview

Techniques are provided for exchanging dedicated hardware signals to manage a first-in first-out (FIFO) structure that is used for transferring control information and/or data. In an embodiment, a first processor causes transferring content into the FIFO. The first processor activates a first hardware signal that is reserved for indicating that content resides within the FIFO and is available for consumption. A second processor activates a second hardware signal that is reserved for indicating that content is accepted. The second hardware signal causes the first hardware signal to be deactivated. This exchange of hardware signals demarcates a FIFO transaction, which is mediated by interface circuitry of the FIFO.

In an embodiment, the FIFO circuitry manages push, pop, and peek transactions. In an embodiment, execution of a processor is blocked while the FIFO circuitry or FIFO buffer experiences certain temporary conditions, such as transitioning between FIFO states, for example empty to not empty. These conditions are discussed later herein.

In an embodiment, the FIFO contains private storage to facilitate content delivery between processors. In an embodiment, the FIFO delegates content storage to a random access memory (RAM) that is used by multiple processing components.

In an embodiment, the FIFO arranges its contents in at least one linked list. In an embodiment, each content piece may be a unit of work, and the FIFO operates as a work queue.

2.0 Example Computer

Figure 1:
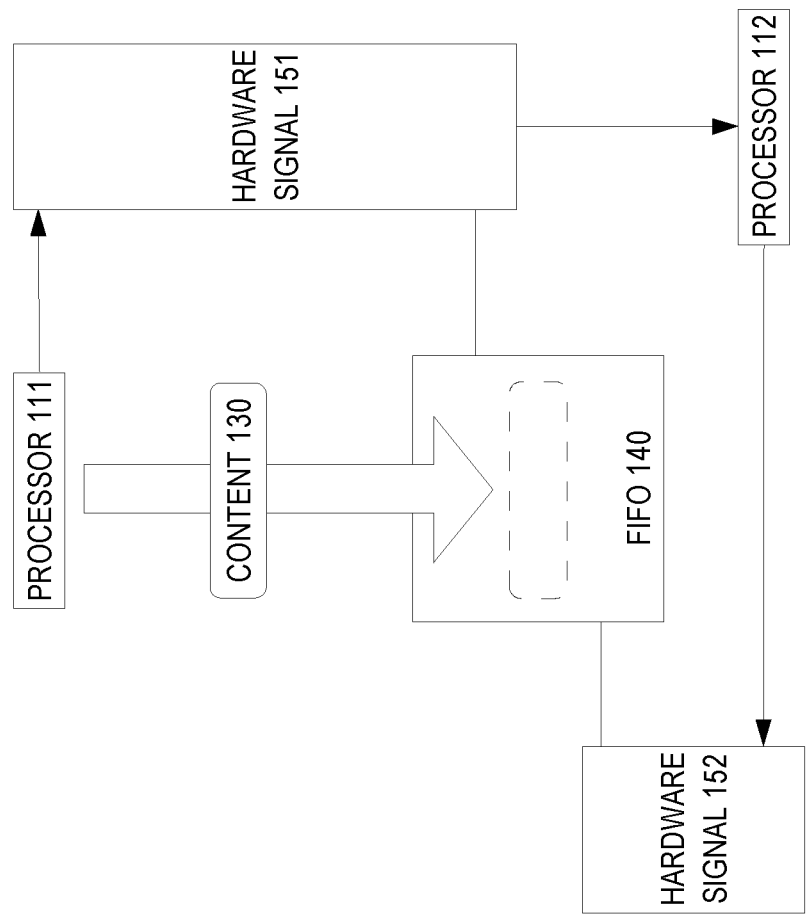
FIG. 1 is a block diagram that depicts an example computer that uses dedicated hardware signals to coordinate the use of a FIFO, in an embodiment.

FIG. 1 is a block diagram that depicts an example computer 100, in an embodiment. Computer 100 uses dedicated hardware signals to manage a first-in first-out (FIFO) that is used by more than one computational processor.

Computer 100 may be a rack server such as a blade, a personal computer, a mainframe, a smartphone, a networked appliance, or other form factor that encloses multiple computational processors. Computer 100 includes processors 111-112 and FIFO 140.

2.1 Processor

In an embodiment, each of processors 111-112 and FIFO 140 resides in a separate chip or set of chips. In an embodiment, some or all of these components reside in a system on a chip (SoC).

Although only one FIFO and two processors are shown, an implementation may have many more FIFOs and processors. In an embodiment, each processor has one or more of its own FIFOs that at least one other processor may access.

Processors 111-112 may each be a central processing unit (CPU) core or a coprocessor. An implementation may have more coprocessors than cores or vice versa.

2.2 FIFO

FIFO 140 has capacity to store at least one piece of content, such as content 130. In an embodiment, content 130 may contain at least one data byte, which perhaps represents an object or other data structure.

In an embodiment, content 130 has a fixed size or maximum size. In an embodiment, content 130 conforms to a particular data structure.

In an embodiment, content 130 may be or may contain a memory pointer, a descriptor, or a unit of work. For example, content 130 may be a token that addresses or otherwise identifies an object in memory.

FIFO 140 may be a hardware FIFO or a software-defined FIFO in random access memory (RAM). The RAM may be shared by some or all processors or may be private to one processor. The capacity of FIFO 140 may be static or dynamic, depending on the implementation.

In an embodiment, the capacity of FIFO 140 is software configurable. For example, a software application may resize FIFO 140 during application initialization.

2.3 Circuitry and Signal

Although FIFO 140 may use a shared RAM for storage, FIFO 140 has dedicated circuitry that manages the storage of FIFO content, including an interface for negotiations with processors 111-112. The interface circuitry may be synchronous or asynchronous, depending on the implementation.

Processors 111-112 use the interface of FIFO 140 to store and retrieve content in FIFO 140. The interface circuitry enables processors 111-112 to coordinate their use of FIFO 140 by exchanging hardware signals that are reserved for accessing the FIFO. In an embodiment, each FIFO has its own set of hardware signals that processors may access.

For example in operation, processor 111 may use FIFO 140 to deliver content 130 to processor 112. Processor 111 may use the interface circuitry to send hardware signal 151 to processor 112 to indicate that FIFO 140 has content for processor 112.

When processor 111 raises (sends) hardware signal 151, FIFO 140 may latch that signal such that signal 151 remains raised. Keeping the signal raised enables processor 111 to fire-and-forget the signal, such that processor 111 need not be blocked and may continue (perhaps unrelated) processing, even though processor 112 may be momentarily too busy with other processing to receive content 130.

In that way, the interface circuitry somewhat decouples the operation of processors 111-112 from each other. This may decrease dark (idle) silicon by increasing concurrency, thereby increasing the throughput of computer 100.

2.4 Storage

In an embodiment, when processor 111 sends hardware signal 151, the interface circuitry of FIFO 140 may copy content 130 from RAM into private storage that is internal to dedicated circuitry of FIFO 140. For example when processor 111 raises hardware signal 151, processor 111 may provide the FIFO interface with a memory address of content 130 for FIFO 140 to use when copying content 130 from RAM into FIFO storage.

To streamline copying of content 130, the size of content 130 may be minimized by content 130 containing a pointer to data in RAM. In this case, content 130 includes the pointer, but not the data to which the pointer refers.

Eventually processor 112 observes that hardware signal 151 is raised and becomes ready to receive content 130. At this time, processor 112 uses the FIFO interface to send hardware signal 152 to retrieve content 130 from FIFO 140.

Upon receiving hardware signal 152, FIFO 140 reacts in two ways. First, it makes content 130 available to processor 112.

For example, FIFO 140 may copy content 130 from FIFO storage into RAM and inform processor 112 as to which memory address does content 130 now reside within RAM.

In another embodiment, content is transferred between FIFO 140 and processors 111-112 over one or more dedicated data buses.

2.5 Transaction

Second, the interface circuitry clears (terminates) both of hardware signals 151-152. For example, the interface circuitry may impose transactional serialization of accesses by processors to avoid race conditions or other corruption to the control state of FIFO 140 or the state of data stored within FIFO 140

Transactions may be serialized by allowing only one processor to raise a given hardware signal at a given moment. For example, two processors may simultaneously attempt to push data onto a same FIFO. Alternatively, one processor may attempt to push data onto the FIFO, while another processor simultaneously attempts to pull data out of the FIFO.

For example in an embodiment, FIFO 140 reserves a hardware flag or signal that indicates whether FIFO 140 is empty (lacks content). In an embodiment, this flag or signal may be subject to a race condition if access to it is unserialized. Likewise in an embodiment, FIFO 140 has a hardware counter that should be protected by serialization to properly tally how many content pieces are stored in FIFO 140.

In any of these cases, proper FIFO operation may require serialization of operations. In an embodiment, contention between two processors that simultaneously try to raise a same FIFO signal may be resolved by blocking the execution of one of those processors.

In an embodiment, the processor whose execution is blocked is the latter of the two processors that are trying to raise the FIFO signal. For example during one clock cycle, one processor may raise a hardware signal that FIFO 140 latches (keeps raised).

During a later clock cycle and while the signal remains raised, another processor may try to raise the same signal. In an embodiment, the execution of an attempt to raise a FIFO signal is blocked while that signal is already raised.

Depending on the embodiment, processors may or may not share a same wire to raise signals. From a functional point of view for example, multiple processors want to push something into the FIFO concurrently.

However, in most on-chip embodiments this is done by each processor having its own dedicated signal (wire), and circuitry selects from among the concurrent signals coming from the processors. In embodiments, a FIFO selects the first or last signal to be raised or a random one as the signal to process. In embodiments, the FIFO selects according to processor identity, in a fixed or round-robin ordering.

3.0 Example FIFO Signaling Process

Figure 2:
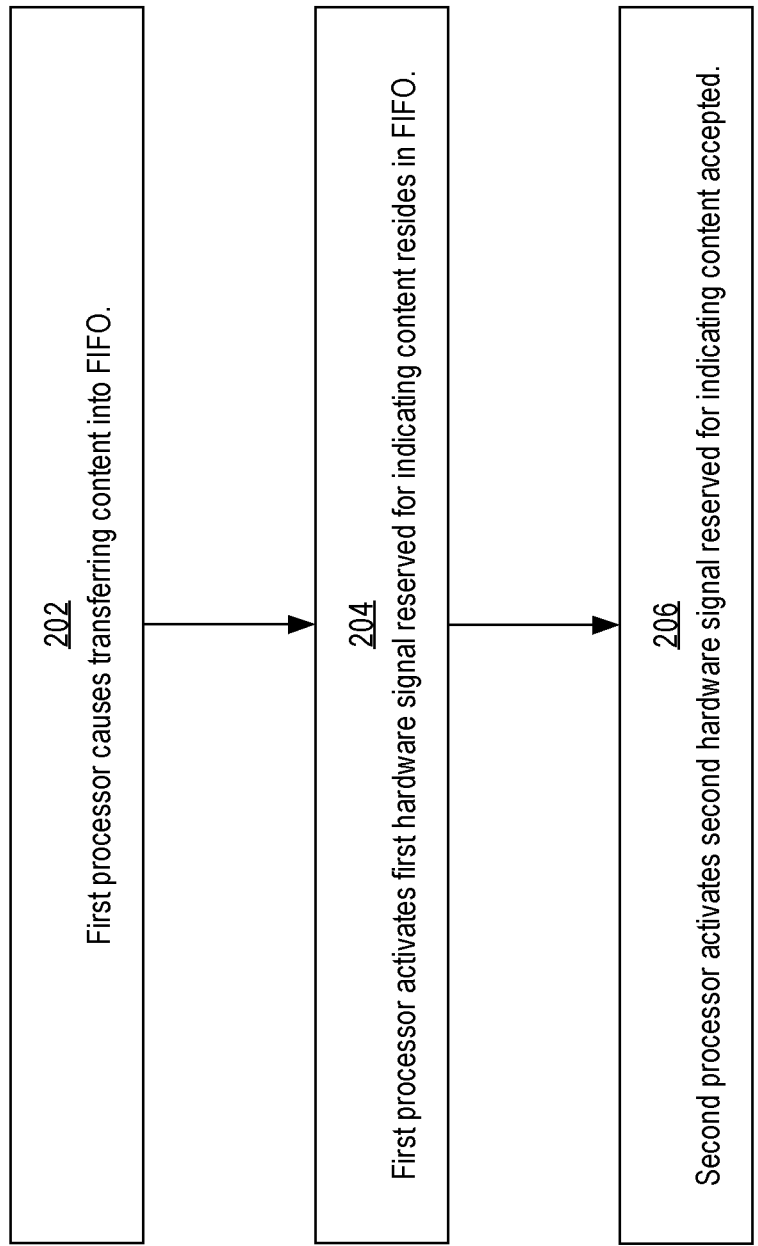
FIG. 2 is a flow diagram that depicts an example process that uses dedicated hardware signals to coordinate the use of a FIFO, in an embodiment.

FIG. 2 is a flow diagram that depicts an example FIFO signaling process that uses dedicated signaling circuitry to coordinate FIFO access by multiple processors, in an embodiment. This FIFO signaling process is described in the context of FIG. 1.

In this example, one processor uses a shared FIFO to deliver content to another processor. In step 202, the first processor causes the content to be transferred into the FIFO. For example, processor 111 may directly copy content 130 from RAM into FIFO 140 and then raise hardware signal 151 or the FIFO control logic may raise HW signal 151 that goes to Processor 112.

In step 204, the first processor activates one hardware signal that that is reserved for indicating that content resides in the FIFO. For example, processor 111 raises hardware signal 151.

In an embodiment, steps 202 and 204 are merged and performed together. For example processor 111 need not directly copy content 130 into FIFO 140. For example, raising hardware signal 151 may cause FIFO 140 to copy content 130 from RAM into FIFO 140.

In step 206, another processor activates another hardware signal that is reserved for indicating that FIFO content is accepted. For example, processor 112 raises hardware signal 152. When hardware signal 152 is raised, circuitry of the FIFO causes both of signals 151-152 to be cleared (deactivated).

Content 130 may be retrieved from FIFO 140 in several ways. In an embodiment, processor 112 copies content 130 from FIFO 140 into private RAM of processor 112 after hardware signal 151 is raised, but before hardware signal 152 is raised.

In another embodiment, processor 112 copies content 130 from FIFO 140 into private RAM of processor 112 after hardware signal 152 is raised. In another embodiment when hardware signal 152 is raised, the FIFO circuitry copies content 130 from FIFO 140 into private RAM of processor 112.

4.0 Example Topology

Figure 3:
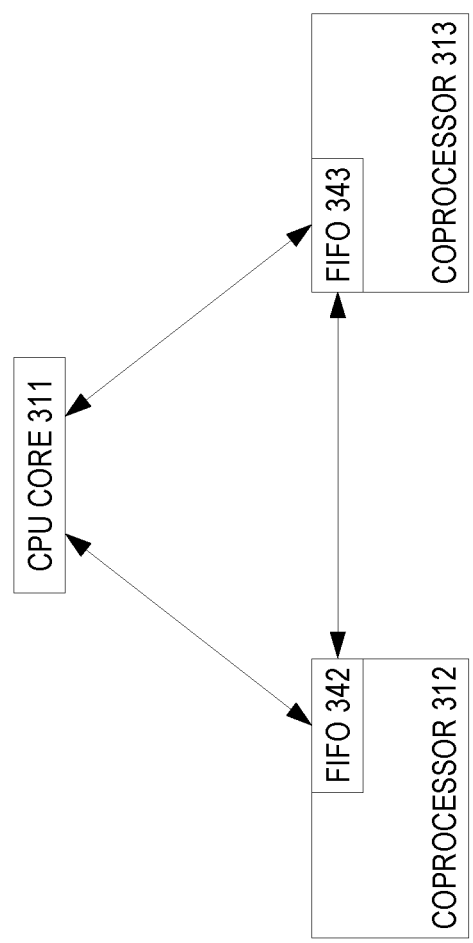
FIG. 3 is a block diagram that depicts an example computer having a fully connected internal topology of processing components, in an embodiment.

FIG. 3 is a block diagram that depicts an example computer 300, in an embodiment. Computer 300 may be an embodiment of computer 100.

Computer 300 has an example internal topology that includes CPU core 311 and coprocessors 312-313. In other implementations, computer 300 may have additional CPU cores and coprocessors.

Each of coprocessors 312-313 includes a respective FIFO 342 or 343. For example, FIFO 342 may have internal storage or may delegate storage to RAM that is included within coprocessor 312.

Each processing component 311-313 is connected to the other processing components by dedicated FIFO signaling circuitry. For example, FIFO 342 has signaling circuitry that is connected to CPU core 311 and coprocessor 313.

In some embodiments, each coprocessor is connected by FIFO circuitry only to a CPU core such as 311. For example, an embodiment might not have circuitry for a peer to peer connection between coprocessors 312-313.

The circuitry of each FIFO manages boundary conditions such as FIFO empty, FIFO overflow, and contentious access to one FIFO by multiple processing components. In some embodiments, processing components 311-313 may share some common RAM.

5.0 Example Scenario

Figure 4:
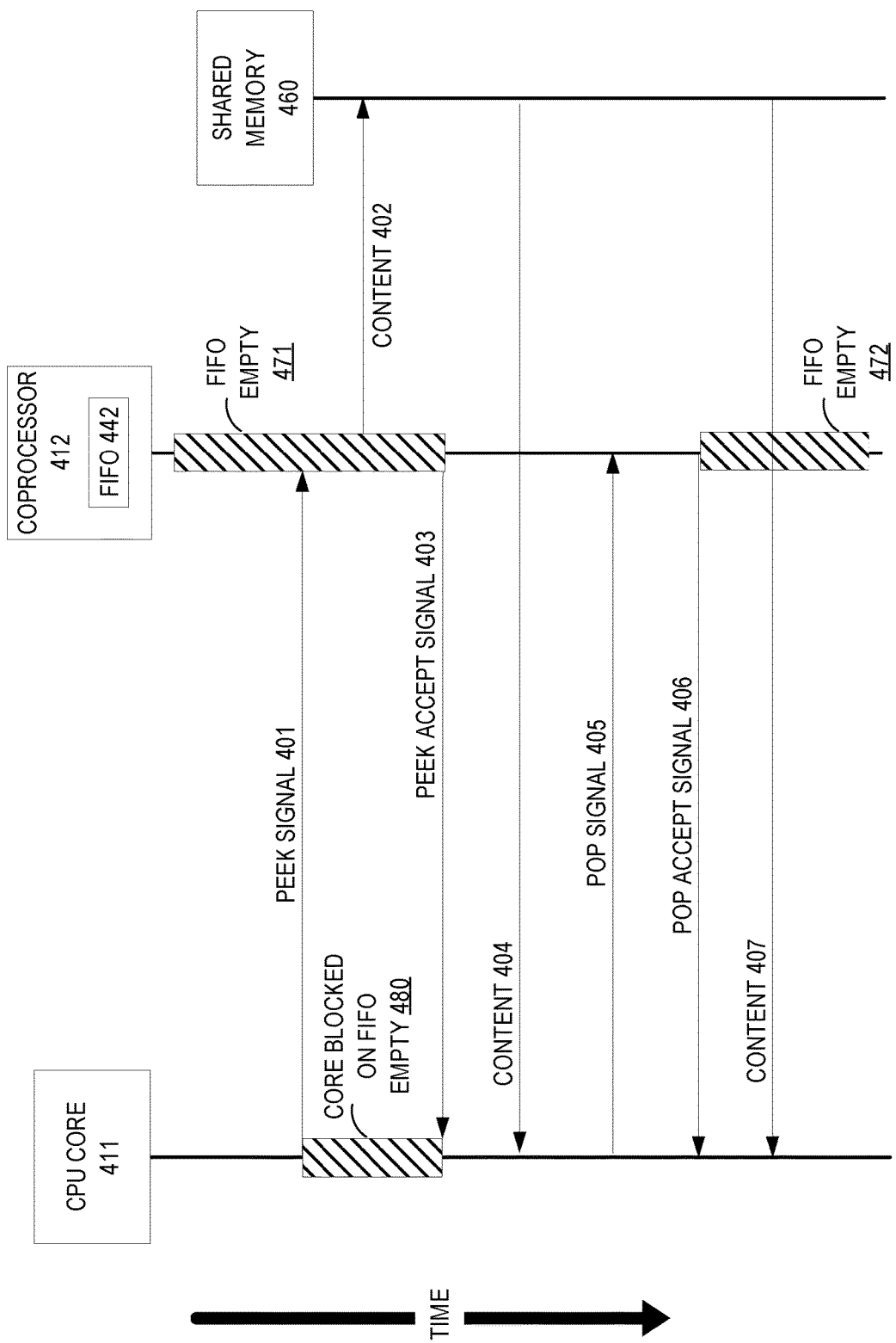
FIG. 4 is a scenario diagram that depicts an example computer that manages data flow when retrieving content from a coprocessor, in an embodiment.

FIG. 4 is a scenario diagram that depicts example interactions between components within an example computer 400 to manage data flow when retrieving content from a coprocessor, in an embodiment. Computer 400 may be an embodiment of computer 100.

Computer 400 includes CPU core 411, coprocessor 412, and shared memory 460. Interactions between these components are shown as horizontal arrows.

Passage of time occurs along the vertical axis, as shown by the bold vertical arrow that points downward to indicate the direction of time. Each of components 411-412 and 460 has its own timeline, shown as a vertical line that emerges from the bottom of each component.

5.1 Condition

At various times, temporary conditions arise that limit the interactions between processing components 411-412. Each of these conditions is shown as a shaded wide vertical segment along the timeline of an affected processing component.

For example, coprocessor 412 includes FIFO 442. One temporary condition occurs when FIFO 442 is empty (lacks content).

In this example, FIFO 442 is initially empty. As such, the timeline of coprocessor 412 begins with a temporary condition shown as FIFO empty 471.

FIG. 4 shows two FIFO transactions, which are shown together for demonstrative purposes. Although these transactions are shown as related to each other, in a production environment these particular transactions might not naturally occur together.

5.2 PEEK

First is a peek transaction that spans from interaction 401 to interaction 404. The peek transaction enables CPU core 411 to non-invasively detect whether FIFO 442 is empty.

For example, CPU core 411 may need content from coprocessor 412 and will wait until such content is available within FIFO 442. As such, CPU core 411 sends a FIFO hardware signal to coprocessor 412, shown as peek signal 401.

5.3 Blocking

At this time, coprocessor 412 has not yet prepared content to give to CPU core 411. As such, FIFO 442 is empty, and so the execution of CPU core 411 is blocked.

This is shown as FIFO empty 480, which is another temporary condition depicted with shading. In an embodiment, CPU core 411 enters a power saving mode while blocked.

In an embodiment, CPU core 411 has multithreading that enables CPU core 411 to context switch to another execution thread while the peek transaction is blocked. For example, CPU core 411 may support simultaneous multithreading such as hyper-threading.

Eventually coprocessor 412 prepares the desired content. This includes coprocessor 412 copying the content into shared memory 460, shown as content 402.

5.4 Transaction Acceptance

Coprocessor 412 then raises a FIFO hardware signal to indicate content availability, shown as peek accept signal 403. Coprocessor 412 raises peek accept signal 403 by activating circuitry of FIFO 442 that is dedicated for delivering that signal.

Coprocessor 412 accompanies peek accept signal 403 with a pointer, such as a memory address, that indicates the storage location of the given content within shared memory 460. In an embodiment, FIFO 442 queues (e.g. internally stores) that pointer as FIFO content. In another embodiment, all of the given content is copied into FIFO 442.

In either case, FIFO 442 is no longer empty. As such, temporary condition FIFO empty 471 terminates, and the circuitry of FIFO 442 delivers peek accept signal 403 to CPU core 411.

Delivery of peek accept signal 403 to CPU core 411 causes FIFO empty condition 480 to terminate. This unblocks CPU core 411, and its execution resumes.

In an embodiment, delivery of peek accept signal 403 to CPU core 411 is accompanied by the given content. In another embodiment, signal 403 is accompanied only by the pointer to the given content.

In another embodiment, peek accept signal 403 occurs without delivering content. In this case, CPU core 411 may optionally retrieve the given content directly from shared memory 460.

This optional retrieval is shown as content 404. CPU core 411 may avoid content retrieval 404 if the purpose of this peek transaction regards only detecting content availability and not actual processing of content by CPU core 411. For example, now that CPU core 411 has detected that content is available, CPU core 411 may have additional work to perform before fetching and processing the given content.

5.5 POP

Next is a pop transaction, which is more or less similar to a peek transaction. The primary difference between these two types of transactions is that a peek transaction is non-invasive.

A peek transaction can detect content availability and perhaps facilitate content retrieval. However, a peek transaction does not disturb the contents of FIFO 442.

For example, peek transactions are idempotent because they treat the FIFO as immutable. That is, whatever content is available to a first peek transaction will also be available for a subsequent peek transaction, so long as there is no intervening transaction that removes content from FIFO 442.

The next transaction shown is a pop transaction, which is an example of a transaction that removes content from FIFO 442. CPU core 411 initiates the pop transaction by sending a FIFO hardware signal to coprocessor 412, shown as pop signal 405.

Because the pop transaction was immediately preceded by a peek transaction (which does not remove content from FIFO 442), FIFO 442 is not empty (still contains content). As such and depending on the implementation, either coprocessor 412 or circuitry of FIFO 442 may more or less immediately send a FIFO hardware signal to CPU core 411, shown as pop accept signal 406.

5.6 Empty

If pop accept signal 406 is immediately delivered to CPU core 411 because FIFO content is already available, then the execution of CPU core 411 will not block. However and although not shown, a pop transaction may block on FIFO empty in the same way as a peek transaction. In an embodiment, CPU core 411 may context switch to another execution thread while a pop transaction blocks.

Unlike a peek transaction, a pop transaction automatically removes content from FIFO 442. For example, delivery of pop accept signal 406 may be accompanied by a pointer to the given content within shared memory 460. CPU core 411 may receive and dereference that pointer to retrieve the given content from shared memory 460, shown as content 407.

Generally, a pop transaction removes only one content piece from FIFO 442. If FIFO 442 has other content pieces, they remain queued within FIFO 442. In an embodiment, a pop transaction may specify how many content pieces to simultaneously remove.

However in this example, the content removed by the pop transaction is the only contents of FIFO 442. As such, FIFO 442 is again empty, which is another significant temporary condition.

This condition is shown as FIFO empty 472. Although FIFO empty 472 has no effect on the pop transaction that causes FIFO empty 472, a subsequent peek or pop transaction may block due to FIFO empty.

In an embodiment not shown, a coprocessor can initiate a pop transaction against the FIFO of another coprocessor. In another embodiment, a coprocessor can initiate a pop transaction against its own FIFO.

5.7 Batch

In an embodiment, the FIFO circuitry blocks a peek or pop transaction until a FIFO contains a software-configurable amount of content pieces. This enables processing of a batch of content pieces.

For example, a peek accept signal or a pop accept signal may not be raised until the FIFO has enough content pieces. In an embodiment, an accept signal is accompanied by pointers or identifiers of specific content pieces included in the batch.

6.0 Another Example Scenario

Figure 5:
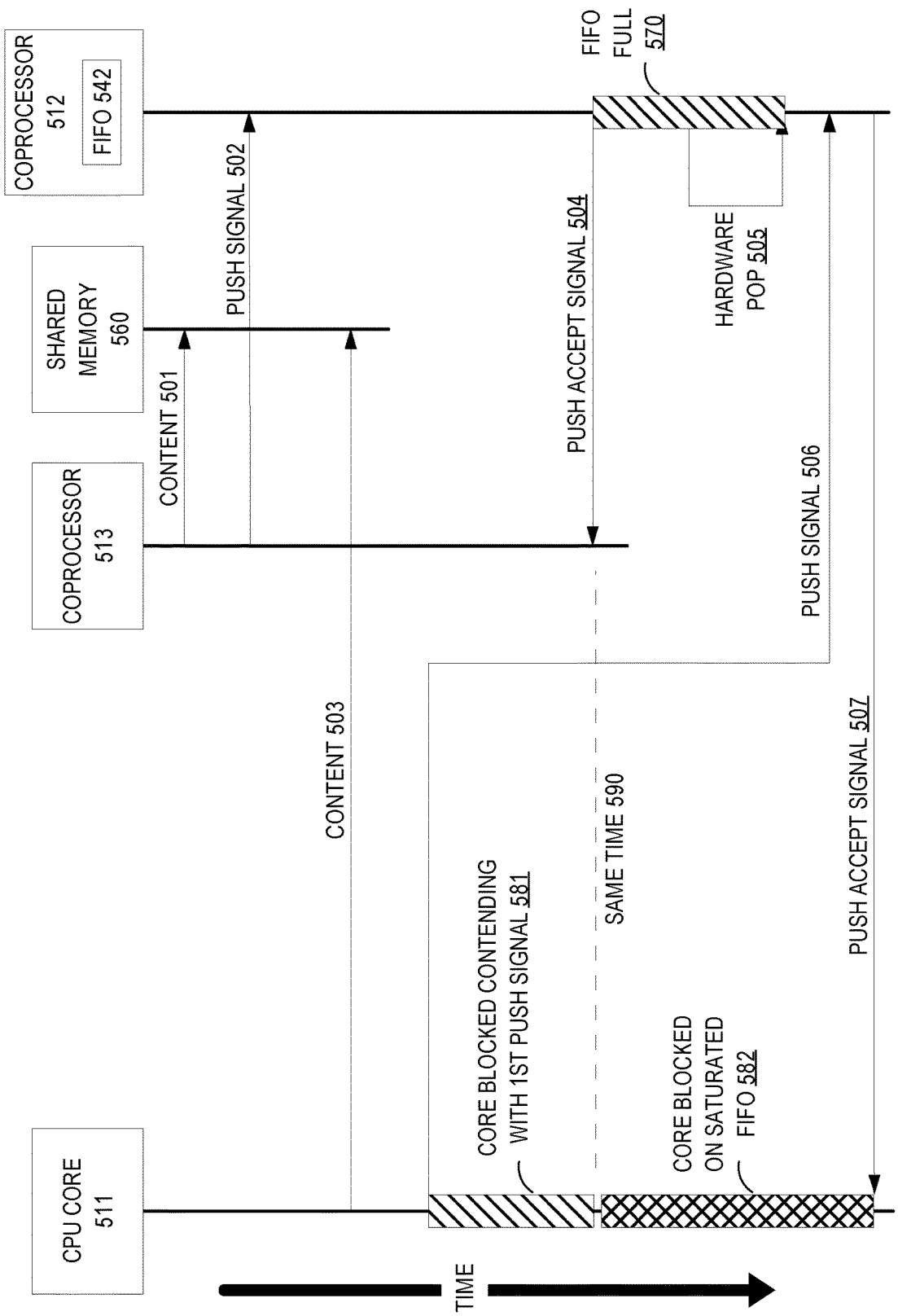
FIG. 5 is a scenario diagram that depicts an example computer that manages data flow and contention when sending content to a coprocessor, in an embodiment.

Empty is not the only more or less temporary condition that may cause blocked execution. FIG. 5 is a scenario diagram that depicts example interactions between components to manage data flow and contention when sending content to a coprocessor within an example computer 500, in an embodiment. Computer 500 may be an embodiment of computer 100.

6.1 Push

Computer 500 includes CPU core 511, coprocessors 512-513, and shared memory 560. Each of these components is involved in at least one of two push transactions that are shown.

A push transaction differs from a pop transaction in a few ways. First, the directionality of the transaction is reversed.

A pop transaction pulls content out of a coprocessor. Whereas, a push transaction pushes content into a coprocessor.

Another difference is that a pop transaction blocks on FIFO empty. Whereas, a push transaction blocks on FIFO full.

In an embodiment having a FIFO of logically unbounded capacity implemented by a heap or other dynamically-allocated memory space, a push transaction blocks while the heap is exhausted due to the underlying semantics of general memory management. For example, FIFO content may be stored as nodes of a linked list on a heap that is shared with other software layers or other FIFOs. When FIFOs share a heap, a push to one (possibly empty) FIFO may block because another FIFO contains much content.

In this example, both transactions push content to coprocessor 512. One push transaction is initiated by CPU core 511 and another push transaction is initiated by coprocessor 513. In an embodiment not shown, only a CPU core can initiate a push transaction.

Initially, coprocessor 513 has prepared content for coprocessor 512. Coprocessor 513 copies the prepared content into shared memory 560, shown as content 501.

Coprocessor 513 initiates a first push transaction by sending a FIFO hardware signal to coprocessor 512 to indicate content availability. This is shown as push signal 502.

6.2 Contention

CPU core 511 also initiates a second push transaction more or less simultaneous to the first push transaction. As such, both push transactions partially overlap in time.

For example, CPU core 511 prepares content and copies it into shared memory 560, shown as content 503. CPU core 511 also attempts to send push signal 506 to coprocessor 512.

Coprocessor 512 includes FIFO 542. Because both push transactions overlap, FIFO 542 is a shared resource that experiences contention.

The circuitry of FIFO 542 manages contention by serializing transactions. For example, FIFO 542 may block the second push transaction at least until the first push transaction finishes, which is shown as FIFO contention 581.

During FIFO contention 581, the execution of CPU core 511 blocks. In embodiments, either of processing components 511 and 513 may context switch while blocking on a transaction such as a push transaction.

The first push transaction remains ongoing until push signal 502 is cleared, which may not occur until coprocessor 512 sends push accept signal 504 to coprocessor 513. Push accept signal 504 may cause various reactions.

For example, push accept signal 504 causes the content (or a pointer to it) that was staged within shared memory 560 during interaction 501 to be copied into FIFO 542. This may cause FIFO 542 to fill up if that content is copied into the last of the spare storage capacity of FIFO 542, shown as FIFO full 570.

Push accept signal 504 also completes the first push transaction. This means that contention for FIFO 542 by processing components 511 and 513 is finished.

As such, FIFO contention 581 terminates. However in this example, termination of contention 581 does not unblock the second push transaction that CPU core 511 is attempting.

6.3 Saturation

Despite an absence of contention, FIFO 542 now has no spare capacity to receive the content of the second push transaction. Thus, termination of FIFO contention condition 581 is immediately followed by FIFO saturation (full) condition 582.

Push accept signal 504 causes and is more or less simultaneous to the transition from blocking condition 581 to blocking condition 582. This simultaneity is shown as same time 590.

Although blocking conditions 581-582 are shown as separate segments, CPU core 511 experiences them serially as a single combined period of blocking. For example, if CPU core 511 is in a low power mode during FIFO contention 581, then CPU core 511 remains in that low power mode without interruption during the transition between blocking periods 581-582, and the low power mode continues throughout blocking period 582.

As such, attempted delivery of push signal 506 is blocked at least until FIFO full 570 terminates, which requires removal of at least one content piece from FIFO 542. In this example, coprocessor 512 performs some logic that eventually removes a content piece.

6.4 Hardware POP

This removal may occur by a pop transaction that is initiated by some processing component. Alternatively and shown as hardware pop 505, the hardware of coprocessor 512 or FIFO 542 may automatically detect that a content piece within FIFO 542 is no longer needed.

6.5 Workflow

For example, FIFO 542 may be dedicated to storing only content pieces that each describe a unit of work. For example, FIFO 542 may be a work queue. As such, when coprocessor 512 completes a work item, the hardware may detect this condition and automatically remove the work item from FIFO 542, shown as hardware pop 505.

Regardless of what causes a content piece to be removed from FIFO 542, the removal may cause additional results. For example after removal, FIFO 542 is no longer completely full.

Thus, FIFO full condition 570 terminates. The circuitry of FIFO 542 detects that FIFO full condition 570 has terminated and so delivers push signal 506 to coprocessor 512.

Delivery of push signal 506 causes FIFO 542 to accept (store) the content that was stored into shared memory 560 during interaction 503. As such, coprocessor 512 may more or less immediately send push accept signal 507.

Receipt of push accept signal 507 causes FIFO saturation condition 582 to terminate. Termination of condition 582 unblocks CPU core 511.

In an embodiment, a coprocessor has at least one inbound FIFO and at least one outbound FIFO. Push transactions may use the inbound FIFO, and peek and pop transactions may use the outbound FIFO.

In an embodiment, each coprocessor has its own data bus that is connected to a CPU core. Peek and pop transactions may retrieve content over this bus from a FIFO.

In an embodiment, a single multi-drop data bus connects multiple coprocessors to a CPU core. A push transaction may store content over this bus into a FIFO.

7.0 Memory Management

Figure 6:
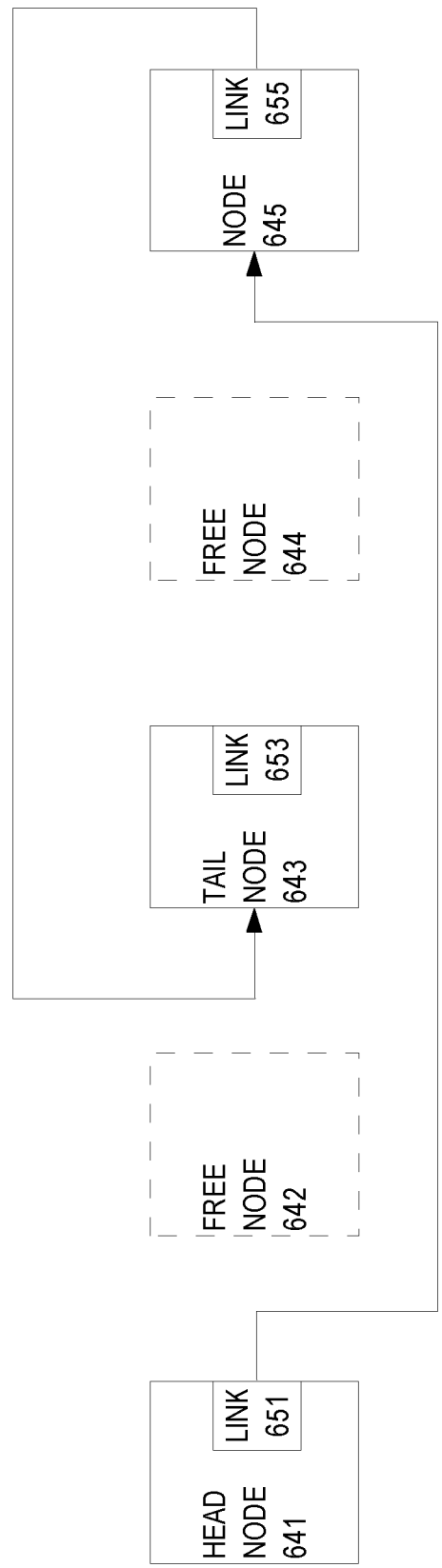
FIG. 6 is a block diagram that depicts an example computer that maintains a linked list of FIFO contents, in an embodiment.

FIG. 6 is a block diagram that depicts an example computer 600, in an embodiment. Computer 600 arranges FIFO content into a linked list. Computer 600 may be an implementation of computer 100.

As explained above, a FIFO may delegate the storage of its contents to a RAM that the FIFO shares at least with its own coprocessor. In an embodiment, FIFOs of multiple coprocessors use a same shared RAM for storage.

Dynamic allocation of a portion of that RAM to store a content piece may be slow. For example, a memory heap of a C program may be prone to fragmentation. This may cause the asymptotic speed of a heap function such as malloc( ) or free( ) to be somewhat non-deterministic.

Such unpredictable speed may be more or less tolerable for some applications. Unpredictability may be unsuitable for an application that requires high bandwidth or low latency.

7.1 Pre-Allocation

To accelerate allocation for content storage, a FIFO may use a pre-allocated buffer within the RAM. The pre-allocated buffer may be divided in advance into portions of fixed size, with each portion available to store one content piece or multiple content pieces.

In an embodiment, the buffer is tightly controlled by hardware or firmware. For example, a FIFO may have dedicated circuitry that manages a head pointer and a tail pointer of a circular queue or manages the links between content nodes of a linked list. In an embodiment, the buffer provides only raw storage, has no inherent semantics or structure, and so is under the more or less full control of software that runs on the coprocessor.

7.2 Reconfiguration

In an embodiment, the buffer has a fixed total size. In an embodiment, software dynamically configures the total size of the buffer, perhaps growing the buffer according to demand or shrinking the buffer according to memory scarcity. As such, a buffer may have more or less unbounded capacity.

As explained previously, a FIFO may be subject to contention and may have circuitry that is dedicated to manage contention, perhaps by imposing serialization of transactions, and/or perhaps by causing the executions of one or more processing components to block. Contention management may be needed to prevent corruption of FIFO content or corruption of FIFO control.

Buffer pre-allocation may prevent fragmentation. However, pre-allocation does not prevent contention.

In an embodiment, a fixed size buffer may be configured as a circular queue.

7.3 Linked List

A more flexible technique involves arranging the portions of the buffer into at least one mutable linked list. In the embodiment shown, a single list reduces contention by performing a FIFO transaction with one portion of the buffer for one processing component, while another processing component simultaneously copies content into another portion of the buffer.

As shown, each portion of the buffer may be a node in linked list of content pieces stored within the FIFO. Not all nodes are included in the list—they are not included until they have been pushed (added) to the FIFO.

For example, free nodes 642 and 644 are not linked into the list, because they are free (not storing a content piece). Whereas, nodes 641, 643, and 645 are linked into the list, as shown by arrows that join these nodes together.

7.4 Pointer

Each arrow emerges from a link implementation, such as 651, which may be a pointer contained within a referring node. In an embodiment, such a pointer is implemented as a memory address.

In a typical embodiment, the nodes of the buffer are contiguous. In an embodiment that conserves space by leveraging aspects of contiguity, the buffer is treated as an array of nodes, and each pointer is implemented as an array index of the referred node.

For example, node 645 occupies an array position that has an array index of four, assuming that the array positions are numbered from left to right, beginning at zero. For example, the shown buffer with five nodes needs only a few bits or at most a byte to encode an array index as a pointer, which is a small fraction of the size of an address-based pointer.

7.5 Metadata

In an embodiment, the FIFO circuitry prevents the software of a processing component from directly rearranging the linked list. For example, each node may have metadata that includes a link pointer and cannot be directly modified by software.

In an embodiment, the FIFO circuitry does not protect node metadata and instead trusts processing components to honor the inviolability of node metadata—this is often referred to as a ownership model between hardware and software. Software owns the buffer/node until it is pushed onto the list, at which point ownership transfer to hardware. In an embodiment, the FIFO circuitry prevents all direct access to the nodes of the list and the contents of the nodes.

7.6 Interface

In embodiments that partially or completely protect nodes, the interface circuitry of the FIFO provides mechanisms (such as the hardware signals described above) for software to indirectly accomplish list access.

For example, a push signal may cause the FIFO circuitry to store content (or a pointer to content) in a previously free node, such as 642. For example, the circuitry of the FIFO may copy the content into free node 642 and then append node 642 onto the linked list by assigning link 653 to point to node 642.

Likewise, a pop signal may cause the FIFO circuitry to remove the tail node from the linked list, which causes the node pointed to by the link pointer of the node being removed from the list to be the new tail node. For example, the circuitry of the FIFO may delete the tail node of the list, node 641. The node pointed to by the link pointer of node 641 (link 651 points to node 645) becomes the new tail node of the list.

7.7 Queue

If the FIFO is to operate as a queue, then the link list must be operated in a consistent way. For example, nodes must always be appended to the same end of the list and always removed from the opposite end.

For example, at one end of the list may be the head node, such as 643. At the other end of the list may be the tail node, such as 641. The tail node is the node that was the first node added to the list and the head node is the node that was the last node added to the list.

Although the links of the list are directed, this does not imply that content flows through the queue in the same direction as the links. In one embodiment, a node is only appended to the head of the list, thereby becoming the new head node of the list. In another embodiment, a node is only appended to the tail of the list, thereby becoming the new tail node of the list.

This does not mean that the FIFO may operate as a dequeue (double-ended queue). Rather, it means that the FIFO is either forward linked or reverse linked. That is in an implementation, the link between a node already at the insertion end of the FIFO and a new node being inserted may be implemented as a pointer within the new node being inserted or as a pointer within the node already at the insertion end of the FIFO.

In an embodiment the FIFO maintains additional metadata that is not part of any node. For example, the FIFO may maintain a head pointer and a tail pointer that point to the nodes at opposite ends of the list. The head pointer is updated when a new node is pushed onto the list and the tail pointer is updated when an existing node is popped off of the list.

7.8 Dual Lists

In an embodiment not shown, contention is further reduced (concurrency is further increased) by dividing the nodes of the buffer between two linked lists. For example, free nodes 642 and 644 may be linked into a list of free nodes—a free list.

For example, one FIFO transaction may manipulate the free list, while another FIFO transaction simultaneously manipulates the live list of nodes that actually contain content. For example, the first FIFO transaction may remove a node from the free list as a preface to storing content in the node and eventually adding the node to the live list.

Whereas, the other FIFO transaction may simultaneously remove a node from the live list because the node is no longer needed and appending that node onto the free list. As such, the lifecycle of a node may entail repeated shuffling back and forth from one list to the other list as the node is reused in various transactions and each time storing new content.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
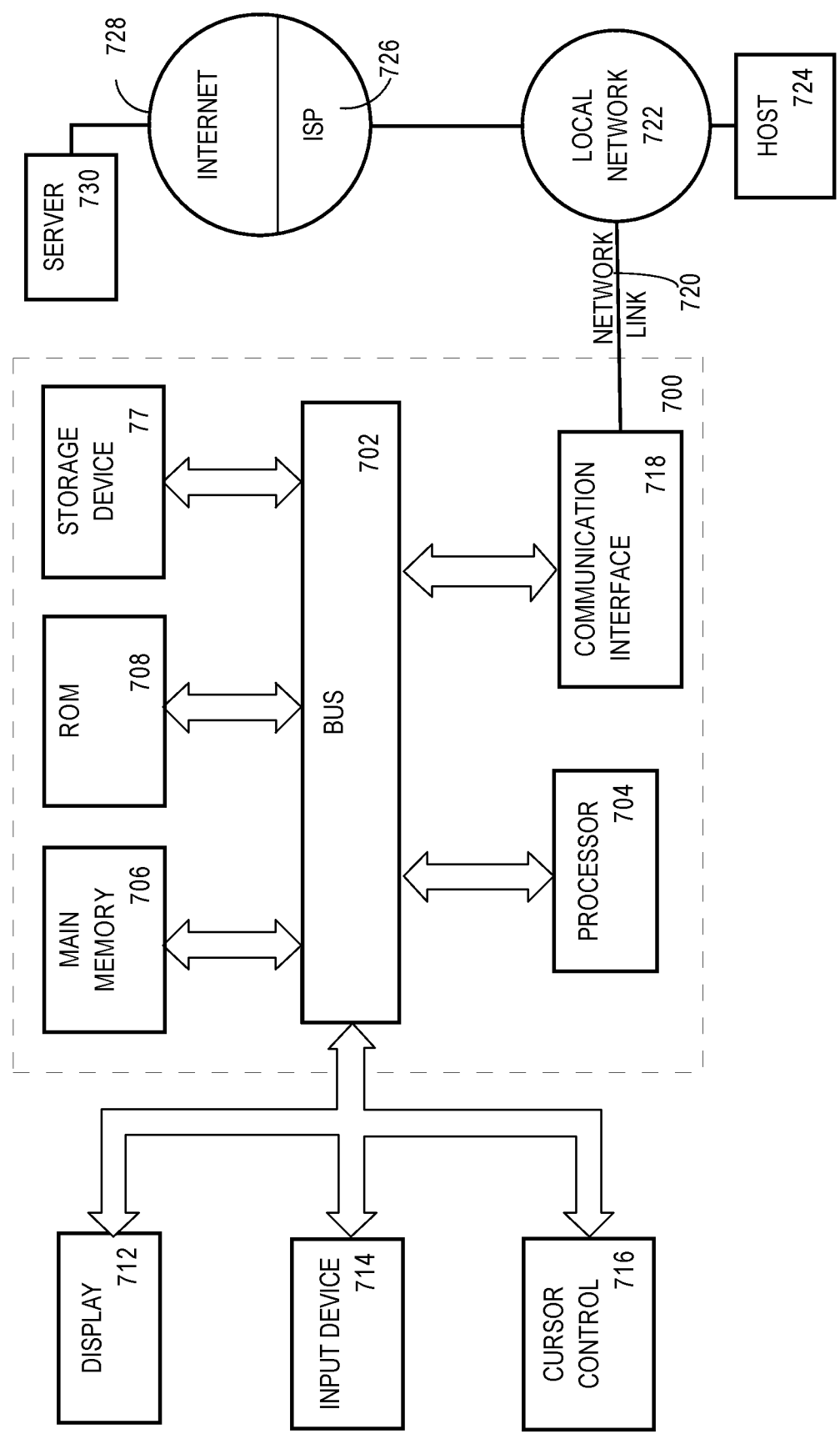
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 77, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 77. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 77. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 77 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 77, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing an unallocated linked list that contains a first plurality of content nodes that initially do not contain content for a first-in first-out (FIFO) of pending work for a second processor;
   storing, in a first content node of the first plurality of content nodes, a pointer that points to a second content node of the first plurality of content nodes;
   storing an allocated linked list that contains a second plurality of content nodes that contain content for the FIFO;
   sending, by a first processor, a first hardware signal that indicates that content is available for appending onto the FIFO, wherein said content comprises a memory pointer that identifies, or a descriptor that describes, a unit of work for the second processor;
   in response to said first hardware signal:
     assigning a second pointer, in a third content node in the second plurality of content nodes that contain content for the FIFO in the allocated linked list, to point to the second content node, and
     copying said content into said second content node;
   sending, by the second processor, a second hardware signal that indicates that said content is transferred into said FIFO,
   wherein the method is performed by a computing device that contains the FIFO, the first processor, and the second processor.

2. The method of claim 1 wherein
   said second pointer comprises: a memory address or an array offset.

3. The method of claim 2 wherein:
   said second pointer cannot be directly modified by software, and/or
   the array offset consumes: less space than a memory address, at most one byte, and/or less than one byte.

4. The method of claim 1 wherein said second content node cannot be directly modified by software.

5. The method of claim 1 wherein
   the allocated linked list and the unallocated linked list are a same linked list.

6. The method of claim 5
   further comprising removing a fourth content node from said same linked list during said assigning the second pointer to point to the second content node.

7. The method of claim 1:
   further comprising removing a fourth content node from the unallocated linked list during said assigning the second pointer to point to the second content node.

8. A method comprising:
   a second processor
     blocking said second processor until a first-in first-out (FIFO) contains an amount of content that exceeds a software-configurable threshold;
   sending, by a first processor, a first hardware signal that indicates that content is available for appending said FIFO;
   in response to said first hardware signal, transferring said content into said FIFO by a computing device that contains the FIFO, the first processor, and the second processor;

sending, by said second processor, a second hardware signal that indicates that said content is transferred into said FIFO.

9. The method of claim 8 further comprising a third processor blocking while attempting to send same said first hardware signal until said sending said second hardware signal.

10. The method of claim 9 wherein said third processor blocking is in response to:
selecting, at random, the third processor for said blocking,
selecting, by round robin, the third processor for said blocking,
the first processor initiating said sending the first hardware signal before the third processor initiates said attempting to send same said first hardware signal, or
the first processor initiating said sending the first hardware signal after the third processor initiates said attempting to send same said first hardware signal.

11. The method of claim 9 wherein:
the third processor contains a first execution thread and a second execution thread;
said third processor blocking comprises task switching from the first execution thread to the second execution thread.

12. The method of claim 8 wherein said transferring said content into said FIFO does not occur until the FIFO is not full.

13. The method of claim 8 wherein:
said FIFO is a first FIFO;
the first FIFO and a second FIFO do not have a fixed size;
the first FIFO and the second FIFO compete for space in a same shared memory.

14. One or more non-transitory computer-readable media storing instructions that, when executed by one or more processors, cause:
storing an unallocated linked list that contains a first plurality of content nodes that initially do not contain content for a first-in first-out (FIFO) of pending work for a second processor;
storing, in a first content node of the first plurality of content nodes, a pointer that points to a second content node of the first plurality of content nodes;
storing an allocated linked list that contains a second plurality of content nodes that contain content for the FIFO:
sending, by a first processor, a first hardware signal that indicates that content is available for appending onto the FIFO, wherein said content comprises a memory pointer that identifies, or a descriptor that describes, a unit of work for the second processor;
in response to said first hardware signal:
assigning a second pointer, in a third content node in the second plurality of content nodes that contain content for the FIFO in the allocated linked list, to point to the second content node, and
copying said content into said second content node;
sending, by the second processor, a second hardware signal that indicates that said content is transferred into said FIFO.

15. The one or more non-transitory computer-readable media of claim 14 wherein said second content node cannot be directly modified by software.

16. The one or more non-transitory computer-readable media of claim 14 wherein
the allocated linked list and the unallocated linked list are a same linked.

17. The one or more non-transitory computer-readable media of claim 14 wherein
the instructions further cause removing a fourth content node from the unallocated linked list during said assigning the second pointer to point to the second content node.

18. One or more non-transitory computer-readable media storing instructions that, when executed by one or more processors, cause:
a second processor
blocking said second processor until said FIFO contains an amount of content that exceeds a software-configurable threshold;
sending, by a first processor, a first hardware signal that indicates that content is available for appending said FIFO;
in response to said first hardware signal, transferring said content into said FIFO;
sending, by said second processor, a second hardware signal that indicates that said content is transferred into said FIFO.

19. The one or more non-transitory computer-readable media of claim 18 wherein the instructions further cause a third processor blocking while attempting to send same said first hardware signal until said sending said second hardware signal.

20. The one or more non-transitory computer-readable media of claim 18 wherein:
said FIFO is a first FIFO;
the first FIFO and a second FIFO do not have a fixed size;
the first FIFO and the second FIFO compete for space in a same shared memory.

* * * * *

UNITED STATES PATENT AND TRADEMARK OFFICE
CERTIFICATE OF CORRECTION

PATENT NO. : 10,614,023 B2
APPLICATION NO. : 16/457793
DATED : April 7, 2020
INVENTOR(S) : Brown et al.

It is certified that error appears in the above-identified patent and that said Letters Patent is hereby corrected as shown below:

On the Title Page

On page 3, Column 1, item (56), under Other Publications, Line 22, delete "Upacking" and insert -- Unpacking --, therefor.

On page 3, Column 1, item (56), under Other Publications, Line 25, delete "monedb," and insert -- monetdb, --, therefor.

On page 3, Column 1, item (56), under Other Publications, Line 27, delete "Appollo" and insert -- Apollo --, therefor.

On page 3, Column 2, item (56), under Other Publications, Line 1, delete "Tighly-" and insert -- Tightly- --, therefor.

On page 3, Column 2, item (56), under Other Publications, Line 28, delete "Suplemental" and insert -- Supplemental --, therefor.

On page 4, Column 2, item (56), under Other Publications, Line 2, delete "Aciton," and insert -- Action, --, therefor.

In the Specification

In Column 5, Line 10, delete "140" and insert -- 140. --, therefor.

In Column 5, Line 65, delete "that that" and insert -- that --, therefor.

In the Claims

In Column 16, Line 52, in Claim 7, delete "claim 1:" and insert -- claim 1 --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,614,023 B2

In Column 17, Line 45, in Claim 14, delete "FIFO:" and insert -- FIFO; --, therefor.

In Column 18, Line 15, in Claim 16, delete "linked." and insert -- linked list. --, therefor.